Patented Aug. 26, 1947

2,426,276

UNITED STATES PATENT OFFICE 2,426,276

PREPARATIONS ACTIVE AGAINST COCCI INFECTIONS

Werner Meiser, Wuppertal-Elberfeld, Germany, assignor to Winthrop Chemical Company, Inc., New York, N. Y., a corporation of New York No Drawing. Application January 16, 1940, Serial No. 314,091. In Germany January 19, 1939

5 Claims. (Cl. 167—65)

This invention relates to a preparation which is active against infectious diseases; it further relates to certain new products which are the active ingredients of such preparations.

In accordance with the present invention the esters of para-nitrobenzoic, para-nitro-thiolbenzoic and para-nitro-thionbenzoic acids with aliphatic alcohols which may be substituted by aromatic, alicyclic or heterocyclic radicals possess physical, chemical and bactericidal properties which admirably fit them for use as active ingredients of preparations for the treatment of cocci infections of warm-blooded individuals. The said esters are in part liquid, in part crystalline substances and may be administered by injection or by mouth in liquid form, or in solution preferably in fatty oils, or by mouth also in solid form in the form of powders, tablets or other usual forms. They are non-toxic in therapeutic doses and non-irritating to human and animal tissues. The said properties have been demonstrated by proper pharmacological, bacteriological and clinical experiments as will be shown in more detail hereafter.

Suitable esters of para-nitrobenzoic acid, of para-nitro-thiolbenzoic acid (of the formula $O_2N-C_6H_4-CO-SH$) and of para-nitro-thionbenzoic acid (of the formula $$O_2N-C_6H_4-CS-OH)$$

are for instance the esters with methyl, ethyl, propyl, butyl, isobutyl, amyl, isoamyl, allyl and crotyl alcohols or mercaptans. Likewise the esters with substituted alcohols or mercaptans, for instance, halogenated, hydroxylated, alkoxylated, carboxylated and carbalkoxylated alcohols and mercaptanes have proved the above-mentioned properties and, therefore, such substituted alcohols and mercaptanes, for instance, β-chloroethanol, trichloroethanol, 5-bromo-pentanol, glycol, glycerol, hydroxy acetic ester, lactic ester, 2-chloroethylmercaptane, 3-bromopropylmercaptane as well as the simple mercaptanes are intended to be included when using the term "aliphatic alcohol" in this specification and the appended claims for the esterification component of the para-nitrobenzoic acid and its thiol- and thion-analogues. The said esterifying alcohols may also be substituted by alicyclic, aromatic or heterocyclic radicals as for instance in cyclohexyl-ethyl, benzyl, nitrobenzyl, phenylethyl, para-tolylethyl, 3-phenylpropyl, 1-phenyl-2-propyl, 4-phenylbutyl, 2-phenyl-allyl, phenoxyethyl, para-chloro-phenoxyethyl, cinnamic and 4-methyl-cinnamic alcohols and hydroxy-acetophenone.

I have also produced many new esters of the said acids some of which are distinguished by physical, bactericidal and therapeutic properties by which they are particularly useful in the treatment of cocci infections. Such new esters are, for instance, the esters of para-nitrobenzoic ester with 2-methylpentanol-1 ($b_{0.6}$ 152–153° C.), 1-methyl-pentane- (4.55)- ol-(1) $b_{0.8}$ 160° C.), n-hexanol ($b_{0.8}$ 168° C.), n-heptanol ($b_1$ 175° C.), 1-methylhexanol-1 (m 65° C.), 2-methylhexanol ($b_{0.7}$ 165–167° C.), n-octanol ($b_1$ 180–182° C.), 2-methylheptanol ($b_{1.5}$ 160–161° C.), nonylalcohol ($b_{0.5}$ 180–181° C.) dodecanol (m 44° C.), tetradecanol (m 45° C.), cetylalcohol (m 59° C.), octadecanol (m 65° C.), oleylalcohol (liquid), the alcohol mixture obtained by reduction of the fatty acids from palm-kernel oil ($b_1$ 180–248° C.), 2-butoxyethanol ($b_{1.5}$ 158–159° C.), 2-methoxy-butanol ($b_1$ 161° C.), α-phenyl-α-hydroxyacetic methyl ester (m 106° C.), 4-methyl-thiozolyl-(5)-ethanol (m 125° C.), β-cyanoethanol (m 80° C.), β-hydroxypropionic ethyl ester (m 42° C.), furthermore the esters of para-nitro-thiolbenzoic acid with isopropylmercaptane (m 69° C.), dodecylmercaptane (m 49° C.), 2-methyl-pentanethiol-(1) ($b_1$ 170–171° C.), n-octylmercaptane (m 36° C.) and the esters of para-nitro-thionbenzoic acid with ethanol (m 105° C.), butanol (m 38° C.), dodecanol (m 48° C.) and 3-phenyl-propanol (m 40° C.). The benzene nucleus of the nitrobenzoic acid radical may also contain substituents, such as halogen, alkyl, alkoxy, nitro, carboxyl and esterified carboxyl groups as for instance, in 2.4-dinitrobenzoic dodecyl ester (m 58–59° C.), 2-chloro-4-nitrobenzoic docecyl ester (m 38° C.), para-nitro-phthalic acid bis-dodecyl-ester (m 51° C.) and bis-isopropylester ($b_2$ 170° C.).

The said new products may be prepared for instance by saturating a mixture of a para-nitrobenzoic acid and an alcohol or mercaptane with hydrogen chloride or hydrogen bromide while heating the mixture for some time or by heating such mixture with the addition of sulfuric or other suitable acids; furthermore the para-nitrobenzoic acid halides may be reacted with the alcohol or mercaptane with splitting off of hydrogen halide, if desired with the addition of an acid-binding agent, for instance organic bases, such as pyridine, or alkalis, such as alkali metal carbonate or hydroxide, and in the presence of an indifferent or aqueous medium; the para-nitrobenzoic acid halides may also be reacted with metal alcoholates or thioalcoholates or para-nitrobenzoic acid anhydrides may be reacted with the alcohols or mercaptanes; also the salts of the para-nitrobenzoic acids may be reacted with reactive alkyl esters, such as alkyl halides and alkyl sulfates; otherwise, para-nitrobenzoylhalides may be reacted upon the magnesium-oxygen or -sulfur compounds which are obtained by the action of oxygen or sulfur upon alkyl magnesium halides.

The preparation of the new products is described in more detail in the following examples:

Example 1

16.6 grams of pyridine are gradually added drop by drop to a mixture of 37.1 grams of para-nitrobenzoylchloride, 28.8 grams of normal-nonylalcohol and 40 ccs. of xylene; thereupon the mixture is heated for 3 hours to 120–130° C. The mixture is treated with ether, the ethereal solution washed with water and normal-sodium hydroxide solution and dried with calcium chloride. After removal of the ether the para-nitrobenzoic acid-normal-nonylester is obtained when distilling the residue as a yellowish oil boiling under 1 mm. pressure at 170–171° C. The oil solidifies on good cooling.

Example 2

92.5 grams of para-nitrobenzoylchloride are caused to react on 93 grams of an alcohol mixture, obtained in a known manner from palm kernel oil by reduction, in 100 ccs. of xylene in the presence of 41.5 grams of pyridine while cooling with ice, and the mixture is then heated for 3 hours to 120–130° C.; the mixture is then treated with chloroform, the chloroform solution is washed with water and normal sodium hydroxide solution and then dried. After removal of the chloroform on distillation of the residue the para-nitrobenzoic acid ester of the said alcohol mixture is obtained as an oil boiling under 2.5 mm. pressure at 180–248° C. and solidifying when cooled with ice.

Example 3

92.5 grams of para-nitrobenzoylchloride are heated with 93 grams of dodecylalcohol for 20 hours to 120–125° C. After cooling of the mixture methylalcohol is added, it is filtered with suction and washed with methylalcohol. After recrystallization of the reaction product from methylalcohol the para-nitrobenzoic acid-dodecylester is obtained in white crystals melting at 44–45° C.

The same compound is obtained when treating a mixture of 92.5 grams of para-nitrobenzoylchloride, 93 grams of dodecylalcohol and 75 ccs. of xylene drop by drop with 41.5 grams of pyridine while cooling with ice, so that the temperature of the mixture does not exceed 70° C. Thereupon the mixture is heated for 3 hours to 120–130° C. The xylene is removed under reduced pressure and the residue is treated with ether and water. The ethereal solution is washed with normal sodium hydroxide solution, dried and the ether evaporated. On recrystallization of the residue from a mixture of acetone and methylalcohol the para-nitrobenzoic acid dodecylester is again obtained in white crystals melting at 44–45° C.

The compound is also obtained when saturating a mixture of 33.4 grams of para-nitrobenzoic acid and 61 grams of dodecyl-alcohol with hydrogen chloride. The mixture is then heated to boiling for 5 hours while causing hydrogen chloride to pass through, whereupon solution takes place. After pouring on to ice, the mixture is treated with ether. The ethereal solution is washed with normal sodium hydroxide solution, dried and the ether is removed. After recrystallization of the residue the ester is obtained as described above.

The compound is also obtained when mixing while stirring 19.5 grams of para-nitrobenzoic acid-ethylester with 18.6 grams of dodecylalcohol and 0.02 gram of sodium for some days. After pouring the mixture on to ice and extraction with ether and treatment of the ethereal solution with normal sodium hydroxide solution the ethereal solution is dried and after removal of the ether the residue fractionated. The para-nitrobenzoic acid dodecylester boiling under 1.5 mm. pressure at 196–200° C. is obtained which is recrystallized as described above.

Example 4

18.55 grams of para-nitrobenzoylchloride are heated with 20.2 grams of dodecylmercaptane for 10 hours to 120–125° C. After cooling the mixture the solidified product is washed with methanol and then recrystallized from methanol. The para-nitrothiobenzoic acid-dodecylester is obtained in white crystals melting at 49° C.

The compound is also obtained when dissolving 11 grams of potassium para-nitrothiobenzoate in 70 ccs. of absolute alcohol and treating it with 12.45 grams of dodecylbromide, dissolved in 10 ccs. of absolute alcohol. The mixture is heated to boiling for 3 hours. After cooling of the mixture the product separated is filtered with suction and washed with absolute alcohol. The reaction product is suspended with water, filtered with suction, washed with water and dried. It then is recrystallized from about half a liter of methylalcohol. The ester described above is obtained in white crystals melting at 48° C.

The compound may also be obtained when suspending 92.7 grams of para-nitrobenzoylchloride with 101 grams of dodecylmercaptane in 75 ccs. of xylene and treating the mixture with 41.5 grams of pyridine. A violent reaction takes place, then the mixture is still heated for 3 hours to 120–130° C. The xylene is thereupon distilled off under reduced pressure and the residue is treated with water and ether. After extraction of the ethereal solution with sodium carbonate solution, drying and removal of the ether the solid residue is recrystallized from methylalcohol. The same crystals are obtained as indicated above.

The para-nitro-thiobenzoic acid dodecylester is also obtained in the following manner:

3 grams of phosphoruspentoxide are added gradually to a solution of 3.4 grams of para-nitrobenzoic acid and 4.4 grams of dodecylmercaptane in 40 ccs. of toluene at a temperature of about 100° C. The mixture is further heated for 1 hour, thereafter treated with ice-water and the toluene layer separated. The latter is extracted with normal sodium hydroxide solution and dried with calcium chloride. After distilling off the solvent the residue is recrystallized from methanol. The para-nitrothiobenzoic acid dodecylester is again obtained in white crystals melting at 48° C.

Example 5

A mixture of 42.4 grams of para-nitrobenzoylchloride, 49 grams of tetradecylalcohol and 40 ccs. of xylene is gradually treated with 19 grams of pyridine and then heated for 3 hours to 120–125° C. After the mixture has been further treated in the manner described above, the para-nitrobenzoic acid-tetradecyl-ester is obtained in white crystals melting at 45° C. after recrystallization from methanol.

Example 6

92.75 grams of para-nitrobenzylchloride are heated for 7 hours to 125–130° C. with 121 grams of cetylalcohol. After cooling the mixture is triturated with methanol and filtered with suction. After recrystallization from absolute alcohol the para-nitrobenzoic acid-cetylester is obtained in white crystals melting at 59° C.

Example 7

101 grams of para-nitrobenzoylchloride are heated with 147.2 grams of octadecylalcohol for 16 hours to 125–135° C. After cooling the mixture is triturated with methanol, filtered with suction and the residue washed with methanol. After recrystallization from 2 liters of absolute alcohol the para-nitrobenzoic acid octadecylester is obtained in white crystals melting at 65° C.

Example 8

55.6 grams of para-nitrobenzoylchloride are caused to react with 80.4 grams of oleylalcohol in the presence of 45 ccs. of xylene and 25 grams of pyridine. After 2½ hours' heating to 120–130° C. the mixture is worked up as described above. The reaction product is reprecipitated from absolute alcohol in a mixture of ice and common salt. The para-nitrobenzoic acid-oleylester is obtained as an oil solidifying on strong cooling.

Example 9

24.8 grams of para-nitrophthalic acid chloride are caused to react with 37.2 grams of dodecylalcohol in the presence of 30 ccs. of xylene and 16.6 grams of pyridine. After the usual working up of the mixture the reaction product is recrystallized from one liter of methanol. The para-nitrophthalic acid-didodecylester is obtained in white crystals melting at 51° C.

Example 10

69.15 grams of 2.4-dinitrobenzoylchloride are caused to react upon 55.8 grams of dodecylalcohol in the presence of 55 ccs. of xylene and 25 grams of pyridine. The mixture is heated for 3 hours to 125–130° C. After the usual working up of the mixture the reaction product distils under 1 mm. pressure at 210–220° C. When recrystallized from methanol the 2.4-dinitrobenzoic acid-dodecylester is obtained in yellow crystals melting at 58–59° C.

Example 11

A mixture of 66 grams of 2-chloro-4-nitrobenzoylchloride, 55.8 grams of dodecylalcohol and 55 ccs. of xylene are gradually treated with 25 grams of pyridine. Thereupon the mixture is heated for 3 hours to 120–130° C. The xylene is removed under reduced pressure. The residue is treated with chloroform and water and the chloroform solution is extracted with normal sodium hydroxide solution. After distilling off of the chloroform the residue is recrystallized from methylalcohol. The 2-chloro-4-nitrobenzoic acid-dodecylester is obtained in white crystals melting at 38° C.

The same compound may also be obtained when saturating a mixture of 56 grams of 2-chloro-4-nitrobenzoic acid and 82 grams of dodecylalcohol with hydrogen chloride in the cold; the mixture is then heated for 5 hours on the water-bath. After treating the mixture with water and chloroform the undissolved matter is filtered with suction, the chloroform solution is freed from the acid by extraction with sodium carbonate solution and dried. After removal of the chloroform and recrystallization of the residue from methylalcohol the product as described above is obtained.

Example 12

Air free from carbonic acid and water is passed for 7 hours through a boiling solution of dodecylmagnesiumbromide, prepared from 24.9 grams of dodecylbromide, 2.43 grams of magnesium in 40 ccs. of absolute ether. Thereupon a solution of 18.55 grams of para-nitrobenzoylchloride in 100 ccs. of absolute ether is added drop by drop to the reaction mixture obtained. The mixture is heated to boiling for 3 hours and then poured on to ice, the ethereal solution separated is shaken with dilute hydrochloride acid and then with dilute sodium hydroxide solution. After the drying of the ethereal solution by means of calcium chloride the ether is distilled off and the residue fractionated. The para-nitrobenzoic acid dodecylester boils under 1.2 mm. pressure at 193–196° C. It solidifies on cooling. After recrystallization from methylalcohol it melts at 44° C.

Example 13

3.2 grams of finely sifted sulfur are added in portions to a solution of dodecylmagnesiumbromide, prepared from 24.9 grams of dodecylbromide, 2.43 grams of magnesium and 40 ccs. of absolute ether. When the reaction has ceased the mixture is heated to boiling for 45 minutes. To the suspension obtained a solution of 18.55 grams of para-nitrobenzoylchloride in 100 ccs. of ether is added drop by drop in the cold. The mixture is heated to boiling for 2 hours and then poured on to ice. The ethereal layer is shaken with dilute hydrochloric acid and dilute sodium hydroxide solution. After drying of the ethereal solution by means of calcium chloride and distilling off of the ether the reaction product is separated from the dodecyldisulfide likewise formed by fractionate crystallization from methylalcohol. The para-nitrobenzoic acid thiododecylester is obtained in crystals as described above.

Example 14

55.6 grams of para-nitrobenzoylchloride are heated with 39 grams of normal octylalcohol for several hours to 120–130° C. until the development of hydrochloric acid has ceased. After cooling the mixture is treated with water and ether. The ethereal solution is extracted with normal sodium hydroxide solution and then with water. After drying of the ethereal solution, removal of the ether and fractionation of the residue the para-nitrobenzoic acid-normal-octylester is obtained as yellowish oil boiling under 1 mm. pressure at 180–182° C.

The same compound may also be obtained when heating 19.5 grams of para-nitrobenzoic ethylester with 20 grams of normal octylalcohol and 0.03 gram of sodium for 6 hours to 100° C. The mixture is poured on to ice, extracted with ether and the ethereal solution treated with normal-sodium hydroxide solution. After drying of the ethereal solution by means of calciumchloride, removal of the ether and fractionation of the residue the para-nitrobenzoic acid-normal-octylester is obtained as described above.

Example 15

A mixture of 55.6 grams of para-nitrobenzoylchloride, 31 grams of normal hexylalcohol and 50 ccs. of xylene is treated gradually with 25 grams of pyridine. After the violent reaction has decreased, the mixture is heated for 1 hour to 120–130° C. The xylene is thereupon distilled off under reduced pressure and the residue treated with water and ether. The ethereal solution is shaken with normal sodium hydroxide solution and water and then dried with calcium chloride. The ether is distilled off and the residue rectified. The para-nitrobenzoic acid normal hexylester is obtained as a yellowish oil boiling at 166–167° C. under 0.7 mm. pressure.

Example 16

55.6 grams of para-nitrobenzoylchloride are heated with 31 grams of 2-methylpentanol-1 for several hours to 120–130° C. until the evolution of hydrogen chloride has ceased. After the mixture has grown cold water and ether are added thereto. The ethereal solution is extracted with normal sodium hydroxide solution and water and then dried by means of calcium chloride. After distilling off the ether and rectifying the para-nitrobenzoic acid-isohexylester is obtained as a yellowish oil boiling at 152–153° C. under 0.6 mm. pressure.

Example 17

92.5 grams of para-nitrobenzoylchloride are heated with 58 grams of normal heptylalcohol for several hours to 120–130° C. until the evolution of hydrogen chloride has ceased. After the mixture has grown cold water and ether are added thereto, the ethereal solution is extracted with normal sodium hydroxide solution and water and then dried by means of calcium chloride. After distilling off the ether and rectifying the para-nitrobenzoic acid-normal-heptylester is obtained as a yellowish oil boiling at 175° C. under 1 mm. pressure.

Example 18

A mixture of 925 grams of para-nitrobenzoylchloride, 580 grams of 2-methyl-hexanol-1 and 750 ccs. of xylene is gradually treated with 415 grams of pyridine. After the violent reaction has decreased the mixture is heated for 1 hour to 120–130° C. The xylene is thereupon distilled off under reduced pressure and the residue treated with water and ether. The ethereal solution is shaken with normal sodium hydroxide solution and water and then dried with calcium chloride. The ether is then distilled off and the residue rectified. The para-nitrobenzoic acid isoheptylester is obtained as a yellowish oil boiling at 165–167° C. under 0.7 mm. pressure.

In exactly the same manner the para-nitrobenzoic acid - 1 - methyl-hexanol-1-ester is obtained which boils at 161° C. under 0.6 mm. pressure, the melting point being at 65° C., when using instead of the 2-methylhexanol-1 the 1-methylhexanol-1 under the same conditions.

Example 19

A mixture of 113.2 grams of para-nitrobenzoylchloride, 78 grams of 2-methylheptanol-1 and 100 ccs. of xylene are gradually treated with 50 grams of pyridine. After the violent reaction has decreased the mixture is heated for 1 hour to 120–130° C. The xylene is then distilled off under reduced pressure and the residue treated with water and ether. The ethereal solution is shaken with normal sodium hydroxide solution and water and dried with calcium chloride. The ether is then distilled off and the residue is rectified. The para-nitrobenzoic acid-2-methylheptanol-(1)-ester is obtained as a yellowish oil boiling at 167–169° C. under 0.6 mm. pressure.

The esters specified above may be used as such or in admixture with another or with other substances which are usual as components of medicinal preparations. By mixing several esters the solubility in solvents may be facilitated. The liquid esters, the alcohol radical of which contains about 6–8 carbon atoms, have proved particularly suitable for the manufacture of highly concentrated solutions of the esters in fatty oils and liquids. Suitable fatty oils are, for instance, sesame oil, olive oil and arachis oil which are miscible with such liquid esters.

The therapeutic activity of the esters on infectious diseases of warm-blooded individuals can best be proved by treatment of infected animals. Various kinds of animals have been treated. All the esters recited above have been tested with mice which had been infected by means of cultures of various pathogenic bacteria varieties, since such tests allow the numerical determination of the activity in a convenient manner. The procedure for testing the activity of the esters was always as follows: A series of mice was infected by pathogenic bacteria of a definite type, a number of the infected animals, about a dozen, were left untreated as controls to see the effect of the infection and the other infected animals were treated with the active preparation by injection or perorally. The treatment was performed with gradually increased doses, which were administered once or several times. Whereas in nearly every experiment the untreated control animals all died within two days due to the infection, the therapeutic activity of the products which were administered to the infected animals was proved by the fact that all the treated animals or, due to the graduated dosages a number of the treated animals, were still alive when the control animals had died. Repeated administration of the active products mostly effects complete recovery of the infected animals.

Complete recovery of the animals is in general the result of a sufficiently prolonged treatment with the active compounds. The esters have proved an excellent compatibility when administered by injection or by mouth over a prolonged time. For instance, 0.2 gram of para-nitrobenzoic acid dodecyl ester are well tolerated by 20 grams of mouse when subcutaneously injected in fatty oil solution, whereas, for instance, even 0.005 gram have proved effective. 5 grams of the same product pro kilogram of rat, 0.5 gram pro kilogram of rabbit and 0.2 gram pro kilogram of cat do not have any injurious effect when administered by mouth or by subcutaneous or intraperitoneal injection even on prolonged treatment with these doses.

The para-nitro-thionbenzoic acid esters are obtained by reacting upon para-nitro-benzimino-ethers, their substitution products respectively, with hydrogensulfide or with media which are capable of splitting off hydrogensulfide. Radicals of the various alcohols may be present as ether radicals in the para-nitro-benzimino-ethers used as starting-materials. The said starting-materials are obtainable for instance by reacting upon para-nitro-benzonitrile, its substitution products respectively, with an alcohol in the presence of hydrogenhalide.

Another method of preparing the para-nitro-thionbenzoic acid esters consists in reacting para-nitro-thiobenzoyl halides with an alcohol, if desired in the presence of an acid-binding agent. The para-nitro-thionbenzoic acid esters are yellow products which are insoluble in water, but readily soluble in indifferent organic solvents and particularly in fatty oils and lipoids. The preparation of the said esters is described in more detail in the following examples:

(1) 30 grams of para-nitro-benzimino-ethyl-ether-hydrochloride ("Annalen der Chemie" 298, page 47) are covered with chloroform and transformed into the free base by the addition of potassium carbonate solution and ice while shaking. The two layers formed are separated, the aqueous layer is again extracted with chloroform and the united chloroform solutions are dried with potassium carbonate. Dry hydrogen sulfide is introduced into this solution while cooling. The sulfur which has precipitated is filtered off after some hours and the chloroform distilled off under diminished pressure. The remainder is recrystallized from alcohol. The para-nitro-thionbenzoic acid ethylester is obtained in yellow crystals melting at 105° C.

(2) 70 grams of para-nitrobenzimino-butyl-ether-hydrochloride (melting at 198° C.) are shaken with potassium carbonate solution and ice in the presence of chloroform while cooling. The free base formed is dissolved in chloroform and the solution dried by potassium carbonate. Dry hydrogensulfide is introduced into the chloroform solution during 3 hours. After standing for still some hours the solvent is distilled off under diminished pressure and the residue recrystallized from methylalcohol while adding animal charcoal. The para-nitro-thionbenzoic acid butylester is obtained in yellow crystals melting at 38° C.

(3) 20 grams of para-nitrobenzimino-dodecyl-ether-hydrochloride (melting at 102° C., obtained from para-nitro-benzonitrile, dodecyclalcohol and hydrogenchloride in the presence of benzene) are finely ground and treated with alkali metal carbonate solution and ice in the presence of chloroform. After separating the two layers and again extracting the aqueous layer with chloroform, the united chloroform solutions are dried by potassium carbonate. Dry hydrogensulfide is introduced into the filtered solution. After standing for some hours the solution is filtered, repeatedly shaken with ice-water, dried by calcium-chloride and again filtered. The chloroform is distilled off and the residue recrystallized from alcohol. The para-nitro-thiobenzoic acid-dodecylester is obtained in yellow crystals melting at 48° C.

(4) 40 grams of para-nitrobenzimino-phenyl-propylether-hydrochloride (melting at 184° C., obtained from para-nitrobenzonitrile, phenyl-propylalcohol and hydrogenchloride in benzene) are transformed into the free base as indicated above. The base is dissolved in chloroform and the solution saturated with hydrogensulfide. After standing for some hours the solvent is distilled off under diminished pressure and the residue recrystallized from methanol while adding animal charcoal. The para-nitro-thionbenzoic acid-phenyl-propylester is obtained in yellow crystals melting at 40° C.

I claim:

1. A preparation for combatting cocci infections which comprises a fatty oil solution of a member of the class consisting of the alkyl, cyclo-alkyl-alkyl, aralkyl and heterocyclyl-alkyl esters of paranitrobenzoic acid, paranitro-thiol-benzoic acid, and paranitro-thion-benzoic acid.

2. A preparation for combatting cocci infections which comprises a fatty oil solution of an ester of an acid selected from the group consisting of paranitrobenzoic, paranitro-thiol-benzoic and paranitro-thion-benzoic acids with an alcohol selected from the group consisting of aliphatic alcohols and alicyclically, aromatically and heterocyclically substituted aliphatic alcohols.

3. A preparation for combatting cocci infections which comprises a fatty oil solution of an ester of an acid selected from the group consisting of paranitrobenzoic, paranitrothiol-benzoic and paranitro-thion-benzoic acids with an aliphatic alcohol of 6–18 carbon atoms.

4. A preparation for combatting cocci infections which comprises a fatty oil solution of dodecyl paranitrobenzoate.

5. A preparation for combatting cocci infections which comprises a fatty oil solution of a mixture of esters selected from the esters of p-nitrobenzoic acid with an aliphatic alcohol of 6–18 carbon atoms and the thiol and thion analogues thereof.

WERNER MEISER.

REFERENCES CITED

The following references are of record in the file of this patent:

UNITED STATES PATENTS

| Number | Name | Date |
|---|---|---|
| 1,715,251 | Sabalitschka | May 28, 1929 |
| Re. 19,231 | Carter et al. | July 10, 1934 |
| 950,936 | Luders | Mar. 1, 1910 |
| 1,440,652 | Adams | Jan. 2, 1923 |

FOREIGN PATENTS

| Number | Country | Date |
|---|---|---|
| 179,627 | Germany | Dec. 11, 1906 |
| 230,089 | Great Britain | Jan. 14, 1926 |

OTHER REFERENCES

Chemical Abstracts, vol. 21, page 2658.

Rosenthal et al., Public Health Reports, vol. 54, July 21, 39, #29, pages 1328–1332. (Copy in Sci. Libr.)

Mayer et al.—Comptes Rendus Soc. Biol. (1939), vol. 130, pages 211–214. (Copy Ag. Libr.)

Beilstein—Handbuch Org. Chem., 4th ed., Berlin 1926, vol. 9, pages 390 and 391. (Copy in Div. 6.)